United States Patent
Song et al.

(10) Patent No.: US 9,023,526 B2
(45) Date of Patent: May 5, 2015

(54) POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(75) Inventors: Yu-Mi Song, Yongin-si (KR); Do-Hyung Park, Yongin-si (KR); Seon-Young Kwon, Yongin-si (KR); Min-Han Kim, Yongin-si (KR); Ji-Hyun Kim, Yongin-si (KR); Kyoung-Hyun Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 981 days.

(21) Appl. No.: 13/149,759

(22) Filed: May 31, 2011

(65) Prior Publication Data

US 2011/0305955 A1     Dec. 15, 2011

(30) Foreign Application Priority Data

Jun. 13, 2010   (KR) .................. 10-2010-0055742
Apr. 7, 2011    (KR) .................. 10-2011-0032067

(51) Int. Cl.
*H01M 4/13* (2010.01)
*H01M 4/505* (2010.01)
*H01M 4/525* (2010.01)
*H01M 10/052* (2010.01)
*H01M 4/02* (2006.01)

(52) U.S. Cl.
CPC .............. *H01M 4/505* (2013.01); *H01M 4/525* (2013.01); *H01M 10/052* (2013.01); *H01M 2004/021* (2013.01); *Y02E 60/122* (2013.01)

(58) Field of Classification Search
CPC ......... H01M 4/52; H01M 4/505; H01M 4/88; H01M 4/02; H01M 4/525; H01M 10/052; H01M 2004/028; H01M 2010/0495; H01M 2004/021; Y02E 60/122
USPC ............... 429/231.3, 231.1, 223, 209, 235; 252/182.1; 977/780
See application file for complete search history.

(56) References Cited

U.S. PATENT DOCUMENTS

| | | | |
|---|---|---|---|
| 6,893,776 | B2 | 5/2005 | Naruoka et al. |
| 7,459,338 | B2 | 12/2008 | Nakayama et al. |
| 7,604,899 | B2 | 10/2009 | Oda et al. |
| 7,625,670 | B2 | 12/2009 | Lee et al. |
| 7,645,542 | B2 | 1/2010 | Kase et al. |
| 2007/0111098 | A1 | 5/2007 | Yang Kook et al. |
| 2007/0202410 | A1 | 8/2007 | Takeuchi et al. |
| 2009/0170002 | A1 | 7/2009 | Zhang et al. |
| 2009/0202903 | A1 | 8/2009 | Chiang et al. |
| 2010/0233540 | A1 | 9/2010 | Choy et al. |

FOREIGN PATENT DOCUMENTS

| | | |
|---|---|---|
| CN | 1856890 A | 11/2006 |
| CN | 101047237 A | 10/2007 |
| CN | 101142700 A | 3/2008 |
| CN | 101453006 A | 6/2009 |
| CN | 101478044   * | 7/2009 |
| CN | 101478044 A | 7/2009 |
| EP | 0 944 125 A1 | 9/1999 |
| EP | 1 434 288 A1 | 6/2004 |
| EP | 2 075 864 A2 | 7/2009 |
| EP | 2 154 746 A1 | 2/2010 |
| JP | 2002-151076 A | 5/2002 |
| JP | 2002-203552 | 7/2002 |
| JP | 2004-14296 | 1/2004 |
| JP | 2005-251716 | 9/2005 |
| JP | 2006-86116 | 3/2006 |
| JP | 2007-257985 | 10/2007 |
| JP | 2007-335245 | 12/2007 |
| KR | 10-2004-0007356 | 1/2004 |
| KR | 10-2004-0075769 | 8/2004 |
| KR | 10-2010-0044713 | 4/2010 |

OTHER PUBLICATIONS

Liao, P.Y., et al., *Microstructure and electrochemical performance of $LiNi_{0.6}Co_{0.4-x}Mn_xO_2$ cathode materials*, Journal of Power Sources, vol. 143, (2005), pp. 212-218.
SIPO Office action dated Jun. 3, 2013, with English translation, for corresponding Chinese Patent application 201110158541.3, (28 pages).
JPO Office action dated Jun. 11, 2013, for corresponding Japanese Patent application 2011-114558, (5 pages).
Patent Abstracts of Japan, and English machine translation of Japanese Publication 2005-251716 dated Sep. 15, 2005, listed above, (34 pages).
EPO Search Report dated Aug. 23, 2011 for EP Application No. 11168617 (5 pages).
SIPO Office action dated Mar. 27, 2014, with English translation, corresponding to Chinese Patent application 201110158541.3, (16 pages).
SIPO Office Action dated Aug. 22, 2014 issued in Chinese Application No. 201110158541.3 and English Translation, 10 pages.
Japanese Office action dated Feb. 19, 2013, for corresponding Japanese Patent application 2011-114558, (4 pages).
KIPO Office action dated Feb. 27, 2013, for Korean priority Patent application 10-2011-0032067, (5 pages).
Patent Abstracts of Japan, and English machine translation of Japanese Publication 2002-203552 listed above, (23 pages), 2002.
Patent Abstracts of Japan, and English machine translation of Japanese Publication 2007-335245 listed above, (18 pages), 2007.

* cited by examiner

*Primary Examiner* — Laura Weiner
(74) *Attorney, Agent, or Firm* — Christie, Parker & Hale, LLP

(57) ABSTRACT

A positive active material for a rechargeable lithium battery includes pores having an average diameter of about 10 nm to about 60 nm and a porosity of about 0.5% to about 20%. Also disclosed is a method of preparing the positive active material, and a rechargeable lithium battery including the positive active material.

17 Claims, 8 Drawing Sheets

POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATIONS

This application claims priority to and the benefit of Korean Patent Application Nos. 10-2010-0055742 and 10-2011-0032067, filed in the Korean Intellectual Property Office on Jun. 13, 2010 and Apr. 7, 2011, respectively, the entire contents of which are incorporated herein by reference.

BACKGROUND

1. Field

This disclosure relates to a positive active material for a rechargeable lithium battery, a method of preparing the same, and a rechargeable lithium battery including the same.

2. Description of Related Art

Lithium rechargeable batteries have recently drawn attention as power sources for small portable electronic devices. Lithium rechargeable batteries use an organic electrolyte solution, and thereby have twice the discharge voltage of conventional batteries using an alkaline aqueous solution, and accordingly lithium rechargeable batteries have high energy density.

A rechargeable lithium battery is fabricated by injecting an electrolyte into a battery cell. A battery cell includes a positive electrode including a positive active material capable of intercalating/deintercalating lithium ions and a negative electrode including a negative active material capable of intercalating/deintercalating lithium ions.

For a positive active material, $LiCoO_2$ is widely used. However, since cobalt (Co) is a rare metal, costs for producing $LiCoO_2$ are high and additionally, stable supplies of Co are difficult to secure. Accordingly, a positive active material including Ni (nickel) or Mn (manganese) has been researched.

A positive active material including Ni may provide a high capacity and high voltage battery. However, the structure of a Ni positive active material is unstable and thus capacity is reduced. Also, due to a reaction with the electrolyte solution, a Ni positive active material has weak thermal stability.

SUMMARY

An aspect of this disclosure provides a positive active material having good thermal stability due, in part, to preventing cracks by improving particle strength.

Another aspect of this disclosure provides a method of preparing the positive active material.

Still another aspect of this disclosure provides a high-capacity rechargeable lithium battery including the positive active material.

According to embodiments of the present invention, a positive active material for a rechargeable lithium battery includes pores having an average diameter of about 10 nm to about 60 nm, and a porosity of about 0.5% to about 20%. The pores may have an average diameter of about 20 nm to about 40 nm.

The positive active material may include lithium metal oxide represented by the following Chemical Formula 1. For example, the positive active material may include lithium metal oxide represented by the following Chemical Formula 2 or Chemical Formula 3.

$$Li_aNi_xCo_yMn_zM_kO_2 \quad \text{Chemical Formula 1}$$

In Chemical Formula 1, M is selected from Al, Mg, Ti, Zr, and combinations thereof, $0.95 \leq a \leq 1.2$, $0.45 \leq x \leq 0.65$, $0.15 \leq y \leq 0.25$, $0.15 < z \leq 0.35$, $0 \leq k \leq 0.1$, and $x+y+z+k=1$.

$$Li_aNi_xCo_yMn_zO_2 \quad \text{Chemical Formula 2}$$

In Chemical Formula 2, $0.95 \leq a \leq 1.10$, $0.55 \leq x \leq 0.65$, $0.15 \leq y \leq 0.25$, $0.15 < z \leq 0.25$, and $x+y+z=1$.

$$Li_aNi_xCo_yMn_zO_2 \quad \text{Chemical Formula 3}$$

In Chemical Formula 3, $0.95 \leq a \leq 1.10$, $0.45 \leq x \leq 0.55$, $0.15 \leq y \leq 0.25$, $0.25 < z \leq 0.35$, and $x+y+z=1$.

According to another aspect of this disclosure, a method of preparing a positive active material for a rechargeable lithium battery includes preparing a precipitate by co-precipitating ammonium hydroxide ($NH_4OH$) or sodium hydroxide (NaOH) with a nickel (Ni) source material, a cobalt (Co) source material, and a manganese (Mn) source material; mixing the precipitate and a lithium source material to obtain a mixture; and heat-treating the mixture for about 8 to about 10 hours at about 800° C. to about 950° C. to provide a positive active material including pores having an average diameter of about 10 nm to about 60 nm, and a porosity of about 0.5% to about 20%.

The positive active material may include a lithium metal oxide represented by Chemical Formula 1.

The heat-treating may be performed at about 800° C. to about 900° C.

The co-precipitation reaction may be performed at a stirring speed of about 600 rpm to about 800 rpm, at a pH of about 10 to about 12, and at about 35° C. to about 40° C. for 8 to 10 hours.

The precipitate and lithium source may be mixed at a weight ratio of about 1:1 to about 1:1.1.

According to still another aspect of this disclosure, a rechargeable lithium battery includes a positive electrode including the positive active material; a negative electrode; and an electrolyte.

The rechargeable lithium battery may have a discharge capacity of about 170 mAh/g to about 190 mAh/g.

The positive active material has good particle strength, thereby preventing or reducing the occurrence of cracks after compression, and therefore, the positive active material tends not to react with the electrolyte, and exhibits good thermal stability. As a result, a high-capacity rechargeable lithium battery may be provided.

DETAILED DESCRIPTION

Figure 1:
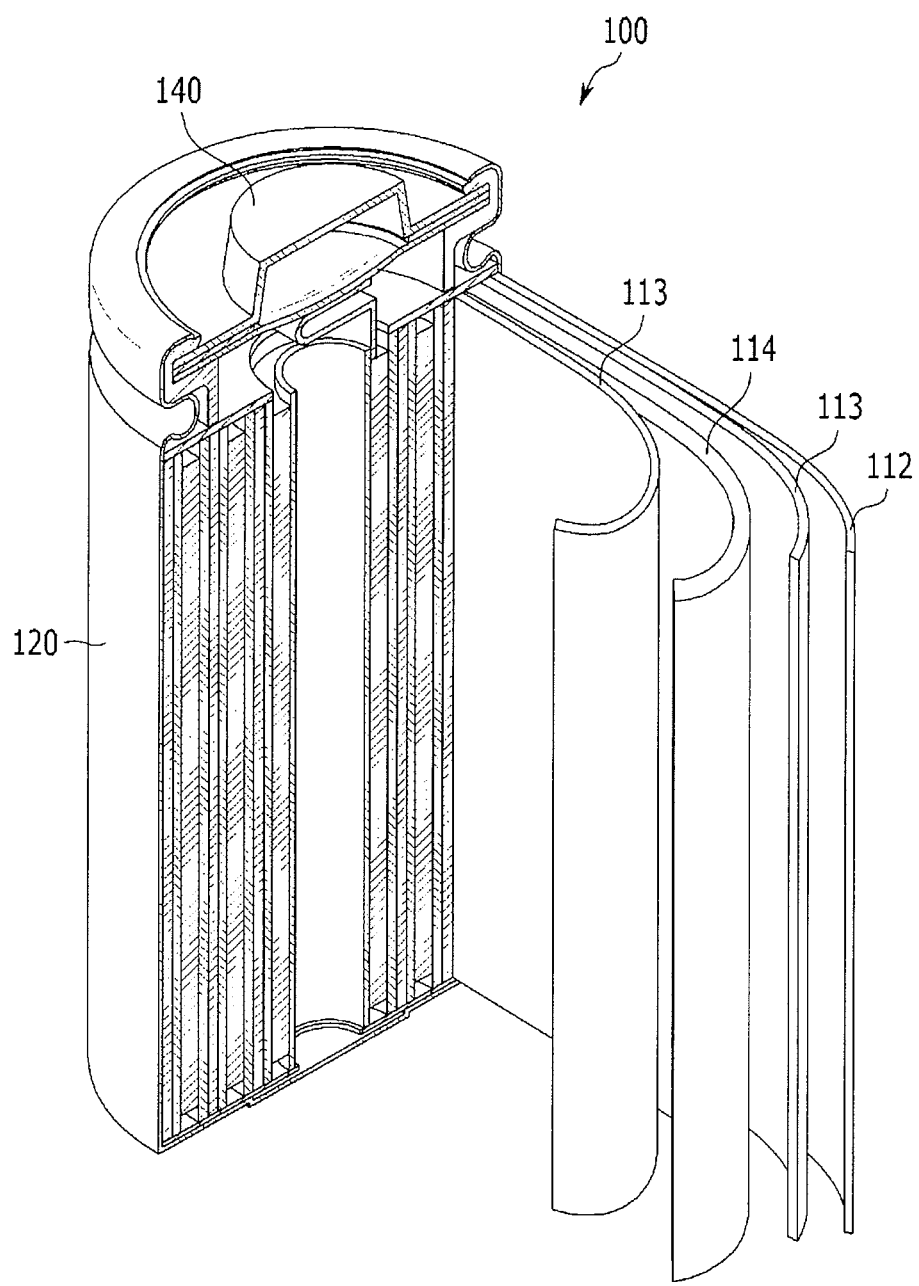
FIG. 1 is a schematic diagram of a rechargeable lithium battery according to one embodiment.

The following detailed description references certain exemplary embodiments, examples of which are illustrated in the accompanying drawings. Throughout the description, like reference numerals refer to like elements. In this regard, the described embodiments are exemplary, and those of ordinary skill in the art will appreciate that certain modifications can be made to the described embodiments. This description is not limited to the particular embodiments described.

A positive active material may include pores, e.g. micropores, and the pores may have an average diameter of about 10 nm to about 60 nm. In an embodiment of the present invention, the pores may have an average diameter of about 20 nm to about 40 nm. When the pores have an average diameter within this range, the positive active material may have improved (i.e., greater) particle strength, and it may crack less during compression. Therefore, the positive active material may not react with the electrolyte and thereby, may have good thermal stability.

The positive active material may have a porosity ranging from about 0.5% to about 20%. In an embodiment of the present invention, the positive active material may have a porosity ranging from about 1% to about 5%. When the porosity is within this range, the positive active material may have improved (i.e., greater) particle strength, and it may crack less during compression. Therefore, the positive active material may not react with the electrolyte and thereby, may have good thermal stability.

The pore sizes and the porosity may be measured using a BET method.

The positive active material including pores may include a lithium metal oxide represented by the following Chemical Formula 1.

$$Li_aNi_xCo_yMn_zM_kO_2 \qquad \text{Chemical Formula 1}$$

In Chemical Formula 1, M is selected from Al, Mg, Ti, Zr, and combinations thereof, $0.95 \leq a \leq 1.2$, $0.45 \leq x \leq 0.65$, $0.15 \leq y \leq 0.25$, $0.15 < z \leq 0.35$, $0 \leq k \leq 0.1$, and $x+y+z+k=1$.

The positive active material may include a lithium metal oxide represented by the following Chemical Formula 2 or Chemical Formula 3.

$$Li_aNi_xCo_yMn_zO_2 \qquad \text{Chemical Formula 2}$$

In Chemical Formula 2, $0.95 \leq a \leq 1.10$, $0.55 \leq x \leq 0.65$, $0.15 \leq y \leq 0.25$, $0.15 < z \leq 0.25$, and $x+y+z=1$.

$$Li_aNi_xCo_yMn_zO_2 \qquad \text{Chemical Formula 3}$$

In Chemical Formula 3, $0.95 \leq a \leq 1.10$, $0.45 \leq x \leq 0.55$, $0.15 \leq y \leq 0.25$, $0.25 < z \leq 0.35$, and $x+y+z=1$.

When the lithium metal oxide includes Ni within the range disclosed by Chemical Formula 1 (i.e., $0.45 \leq x \leq 0.65$), a high-capacity rechargeable lithium battery may be realized.

The lithium metal oxide may be prepared using a solid-phase method by mixing a lithium source powder and a metal source powder including, for instance, Ni, Co, Mn, or the like, and heat-treating the resulting mixture.

The lithium metal oxide may be prepared using a co-precipitation method. For instance, a metal source or sources including Ni, Co, Mn, and the like may be added to a solvent. For instance, a Ni source material, a Co source material, and a Mn source material may be added to a solvent. NH₄OH or NaOH (a coprecipitator) may then be continually mixed into the metal source to prepare a precipitate. A lithium source may then be added to the precipitate to form a mixture, and the mixture may be heat-treated.

The co-precipitation reaction may be performed at a pH of about 10 to about 12, for about 8 to about 10 hours, at a reaction temperature of about 35° C. to about 40° C., and at a stirring speed of about 600 rpm to about 800 rpm. The co-precipitation reaction is performed at a relatively low stirring speed in order to form pores, e.g. micropores. However, when the stirring speed is too low, the particle size may be too large. Therefore, the stirring speed range should be controlled in accordance with the positive active material composition. When the co-precipitation reaction is performed within the above stirring speed range, a positive active material may have an average pore size and a porosity within a desired range. Therefore, a positive active material having relatively high particle strength may be obtained.

The precipitate and the lithium source material may be mixed at a weight ratio of about 1:1 to about 1:1.1. When they are mixed within this range, a positive active material having high particle strength may be obtained.

In one embodiment, the co-precipitation method may be used as a manufacturing method. When a positive active material is prepared using a co-precipitation method, the metal source materials and the lithium source material may be well mixed, and pores, e.g., micropores, may be easily formed.

Examples of the lithium source material include lithium carbonates, lithium acetates, lithium hydroxides, and the like. Examples of the metal source material include metal-containing acetates, metal-containing nitrates, metal-containing hydroxides, metal-containing oxides, metal-containing sulfates, and the like. However, any suitable lithium source material and metal source materials may be used. Other examples of the metal source materials include metal-containing sulfates. The solvent may include water, ethanol, methanol, acetone, or the like.

The heat-treating may be performed after the solid-phase method or the co-precipitation method at about 800° C. to about 950° C. for about 8 to about 10 hours. In an embodiment of the present invention, the heat treatment may be performed at about 800° C. to about 900° C. for about 8 to 10 hours. As described above, the heat-treating is performed at a relatively low temperature in order to form pores, e.g, micropores. However, when the heat-treating temperature is too low, the amount of source materials that do not react may be increased. Therefore, the temperature range should be controlled in accordance with the positive active material composition. When the heat treating is performed within the above temperature and time ranges, the positive active material may have good grain form and a clean surface. Therefore, the positive active material may not react with the electrolyte and may also have improved thermal stability. Accordingly, rechargeable lithium batteries using the positive active material may have relatively high-capacity and good efficiency.

Hereinafter, referring to FIG. 1, a rechargeable lithium battery including the positive active material is described.

FIG. 1 is a schematic diagram of a rechargeable lithium battery according to an embodiment of the present invention. Referring to FIG. 1, the rechargeable lithium battery 100 includes an electrode assembly including a positive electrode 114, a negative electrode 112, and a separator 113 between the positive electrode 114 and negative electrode 112. The rechargeable lithium battery includes an electrolyte (not shown) impregnating the positive electrode 114, negative electrode 112, and separator 113, a battery case 120 including the electrode assembly, and a sealing member 140 sealing the battery case 120.

The positive electrode 114 includes a positive active material layer on a current collector. The positive active material layer includes a positive active material, a binder, and optionally a conductive material.

The current collector may be aluminum (Al), but is not limited thereto.

As described above, a lithium metal oxide including pores may be used as the positive active material. When the lithium metal oxide is used as a positive active material, the resulting lithium battery may have high-capacity. As the particle strength of the positive active material increases, cracking due to compression may be reduced or prevented, and thermal stability with the electrolyte may be improved.

The binder improves the binding properties of the positive active material particles to each other and to the current collector. Non-limiting examples of the binder include polyvinyl alcohol, carboxymethyl cellulose, hydroxypropyl cellulose, polyvinyl chloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, and combinations thereof. However, any suitable binder may be used.

As for the conductive material, any electro-conductive material that does not cause a chemical change may be used. Non-limiting examples of the conductive material include carbon-based materials (such as natural graphite, artificial graphite, carbon black, acetylene black, ketjen black, or carbon fiber), metal-based materials (such as metal powders or metal fibers including copper, nickel, aluminum, silver, and the like), conductive polymers (such as polyphenylene derivatives), and mixtures thereof.

The negative electrode 112 includes a negative electrode current collector and a negative active material layer disposed on the negative electrode current collector.

The negative electrode current collector may include a copper foil.

The negative active material layer includes a negative active material, a binder, and optionally a conductive material.

The negative active material may include a material that reversibly intercalates/deintercalates lithium ions, a lithium metal, a lithium metal alloy, a material capable of doping and dedoping lithium, or a transition metal oxide.

The material that reversibly intercalates/deintercalates lithium ions may be a carbon material. The carbon material may be any carbon-based negative active material conventionally used in lithium ion rechargeable batteries. Non-limiting examples of suitable carbon materials include crystalline carbon, amorphous carbon, and mixtures thereof. The crystalline carbon may be non-shaped, spherical, or sheet-, flake-, or fiber-shaped natural graphite or artificial graphite. The amorphous carbon may be a soft carbon, a hard carbon, mesophase pitch carbide, fired coke, or the like.

Non-limiting examples of the lithium metal alloy include alloys of lithium and at least one metal selected from Na, K, Rb, Cs, Fr, Be, Mg, Ca, Sr, Si, Sb, Pb, In, Zn, Ba, Ra, Ge, Al, Sn.

Non-limiting examples of the material capable of doping and dedoping lithium include Si, $SiO_x$ ($0<x<2$), Si—Y alloys (where Y is an element selected from alkaline metals, alkaline-earth metals, group 13 elements, group 14 elements, transition elements, rare earth elements, and combinations thereof, but is not Si), Sn, $SnO_2$, Sn—Y alloys (where Y is an element selected from alkaline metals, alkaline-earth metals, group 13 elements, group 14 elements, transition elements, rare earth elements, and combinations thereof, but is not Sn), and mixtures thereof. At least one of these materials may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

Non-limiting examples of the transition metal oxide include vanadium oxide, lithium vanadium oxide, and the like.

The binder improves the binding properties of the negative active material particles to each other and to the current collector. Non-limiting examples of the binder include polyvinyl alcohol, carboxymethyl cellulose, hydroxypropyl cellulose, polyvinyl chloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, or the like, and combinations thereof. However, any suitable binder may be used.

The conductive material is included to improve electrode conductivity. Any electrically conductive material may be used as a conductive material so long as it does not cause a chemical change. Non-limiting examples of the conductive material include carbon-based materials (such as natural graphite, artificial graphite, carbon black, acetylene black, ketjen black, and carbon fiber), metal-based materials (such as metal powders or metal fibers including copper, nickel, aluminum, silver, and the like), conductive polymers (such as polyphenylene derivatives), and mixtures thereof.

The negative electrode 112 and the positive electrode 114 may be fabricated by mixing the negative or positive active material, a binder, and optionally a conductive material to form an active material composition, and coating the composition on a current collector. The electrode manufacturing is well known, and thus is not described in detail in the present specification. For instance, the solvent may include N-methylpyrrolidone or the like, but is not limited thereto, and any suitable solvent may be used.

The electrolyte may include a non-aqueous organic solvent and a lithium salt.

The non-aqueous organic solvent serves as a medium for transmitting ions taking part in the electrochemical reaction of the battery. The non-aqueous organic solvent may include a carbonate-based, ester-based, ether-based, ketone-based, alcohol-based, or aprotic solvent.

Non-limiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like.

When linear carbonate compounds and cyclic carbonate compounds are mixed, an organic solvent having high dielectric constant and low viscosity may be provided. The cyclic carbonate and the linear carbonate may be mixed together in a volume ratio ranging from about 1:1 to about 1:9.

Non-limiting examples of the ester-based solvent may include n-methylacetate, n-ethylacetate, n-propylacetate, dimethylacetate, methylpropionate, ethylpropionate, γ-butyrolactone, decanolide, valerolactone, mevalonolactone, caprolactone, and the like. Non-limiting examples of the ether-based solvent include dibutyl ether, tetraglyme, diglyme, dimethoxyethane, 2-methyltetrahydrofuran, tetrahydrofuran, and the like. Non-limiting examples of the ketone-based solvent include cyclohexanone and the like. Non-limiting examples of the alcohol-based solvent include ethyl alcohol, isopropyl alcohol, and the like.

A single non-aqueous organic solvents may be used, or a mixture of solvents may be used. When a mixture of organic solvents is used, the mixture ratio may be controlled in accordance with the desired battery performance.

The lithium salt supplies lithium ions in the battery, enables the basic operation of the rechargeable lithium battery, and may also improve lithium ion transportation between positive and negative electrodes. Non-limiting examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bisoxalato borate, LiBOB), and combinations thereof.

The lithium salt may be used in a concentration ranging from about 0.1 M to about 2.0 M. When the lithium salt is included at a concentration within this range, electrolyte performance and lithium ion mobility may be enhanced due to optimal electrolyte conductivity and viscosity.

The non-aqueous electrolyte may further include over-charge inhibiting additives such as ethylene carbonate, pyrocarbonate, and the like.

The separator 113 may be a single layer or multilayer separator. The separator may be made of, for example, polyethylene, polypropylene, polyvinylidene fluoride, or combinations thereof.

The rechargeable lithium battery may have a discharge capacity of about 170 mAh/g to about 190 mAh/g under the discharge condition of 4.3V, constant current (CC)/constant voltage (CV), and at the 0.1 C rate. In another embodiment of the present invention, the rechargeable battery may have a discharge capacity of about 175 mAh/g to about 185 mAh/g under the same conditions. Accordingly, a rechargeable lithium battery having the disclosed positive active material may have high-capacity and improved thermal stability.

Hereinafter, embodiments of the present invention are illustrated in more detail with reference to Examples. The Examples should not in any sense be interpreted as limiting the scope of the present invention. Portions of the Examples relating to conventional battery manufacturing methods may not be described in the Examples, however, a person having ordinary skill in the art will know how to make and use those portions that are not specifically described.

Preparation of Positive Active Material

Example 1

An approximately 3 M aqueous solution of $NiSO_4$, an approximately 3 M aqueous solution of $CoSO_4$, and an approximately 3 M aqueous solution of $MnSO_4$ were mixed in a mole ratio of 6:2:2. An approximately 7 M aqueous solution of NaOH and an approximately 1 M aqueous solution of $NH_4OH$ were added thereto, and the mixture was continually mixed in a coprecipitator.

The mixture was co-precipitated at a pH of about 11, at about 40° C., and at about 800 rpm, for 8 hours, preparing a $(NiCoMn)OH_2$ precursor. The precursor was washed with water and dried at about 120° C. in an oven. The precursor and $Li_2CO_3$ were mixed at a weight ratio of about 1:1.03 using a hand mixer. The prepared mixture was heated by increasing the temperature at a rate of about 2° C./min to about 860° C. and the mixture was kept at that temperature for about 10 hours to prepare a $LiNi_{0.6}Co_{0.2}Mn_{0.2}O_2$ lithium metal oxide.

Example 2

An approximately 3 M aqueous solution of $NiSO_4$, an approximately 3 M aqueous solution of $CoSO_4$, and an approximately 3 M aqueous solution of $MnSO_4$ were mixed in a mole ratio of 6:2:2. An approximately 7 M aqueous solution of NaOH and an approximately 1 M aqueous solution of $NH_4OH$ were added thereto, and the mixture was continually mixed in a coprecipitator.

The mixture was co-precipitated at a pH of about 11, at about 40° C., and at about 800 rpm, for 8 hours, preparing a $(NiCoMn)OH_2$ precursor. The precursor was washed with water and dried at about 120° C. in an oven, and the precursor and $Li_2CO_3$ were mixed at a weight ratio of about 1:1.03 using a hand mixer. The prepared mixture was heated by increasing the temperature at a rate of about 2° C./min to about 900° C. and the mixture was kept at that temperature for about 10 hours to prepare a $LiNi_{0.6}Co_{0.2}Mn_{0.2}O_2$ lithium metal oxide.

Example 3

An approximately 3 M aqueous solution of $NiSO_4$, an approximately 3 M aqueous solution of $CoSO_4$, and an approximately 3 M aqueous solution of $MnSO_4$ were mixed in a mole ratio of 5:2:3. An approximately 7 M aqueous solution of NaOH and an approximately 1 M aqueous solution of $NH_4OH$ were added thereto, and the mixture was continually mixed in a coprecipitator.

The mixture was co-precipitated at a pH of about 11, at about 40° C., and at about 800 rpm, for 8 hours, preparing a $(NiCoMn)OH_2$ precursor. The precursor was washed with water and dried at about 120° C. in an oven, and the precursor and $Li_2CO_3$ were mixed at a weight ratio of about 1:1.03 using a hand mixer. The prepared mixture was heated by increasing the temperature at a rate of about 2° C./min to about 860° C. and the mixture was kept at that temperature for about 10 hours to prepare a $LiNi_{0.5}Co_{0.2}Mn_{0.3}O_2$ lithium metal oxide.

Example 4

An approximately 3 M aqueous solution of $NiSO_4$, an approximately 3 M aqueous solution of $CoSO_4$, and an approximately 3 M aqueous solution of $MnSO_4$ were mixed in a mole ratio of 5:2:3. An approximately 7 M aqueous solution of NaOH and an approximately 1 M aqueous solution of $NH_4OH$ were added thereto, and the mixture was continually mixed in a coprecipitator.

The mixture was co-precipitated at a pH of about 11, at about 40° C., and at about 800 rpm, for 8 hours, preparing a $(NiCoMn)OH_2$ precursor. The precursor was washed with water and dried at about 120° C. in an oven, and the precursor and $Li_2CO_3$ were mixed at a weight ratio of about 1:1.03 using a hand mixer. The prepared mixture was heated by increasing the temperature at a rate of about 2° C./min to about 900° C. and the mixture was kept at that temperature for about 10 hours to prepare a $LiNi_{0.5}Co_{0.2}Mn_{0.3}O_2$ lithium metal oxide.

Comparative Example 1

An approximately 3 M aqueous solution of $NiSO_4$, an approximately 3 M aqueous solution of $CoSO_4$, and an approximately 3 M aqueous solution of $MnSO_4$ were mixed in a mole ratio of 5:2:3. An approximately 7 M aqueous solution of NaOH and an approximately 1 M aqueous solution of $NH_4OH$ were added thereto, and the mixture was continually mixed in a coprecipitator.

The mixture was co-precipitated at a pH of about 11, at about 40° C., and at about 1000 rpm, for 8 hours, preparing a $(NiCoMn)OH_2$ precursor. The precursor was washed with water and dried at about 120° C. in an oven, and the precursor and $Li_2CO_3$ were mixed at a weight ratio of about 1:1.03 using a hand mixer. The prepared mixture was heated by increasing the temperature at a rate of about 2° C./min to about 970° C. and the mixture was kept at that temperature for about 15 hours to prepare a $LiNi_{0.5}Co_{0.2}Mn_{0.3}O_2$ lithium metal oxide.

Comparative Example 2

An approximately 3 M aqueous solution of $NiSO_4$, an approximately 3 M aqueous solution of $CoSO_4$, and an approximately 3 M aqueous solution of $MnSO_4$ were mixed in a mole ratio of 5:2:3. An approximately 7 M aqueous solution of NaOH and an approximately 1 M aqueous solution of $NH_4OH$ were added thereto, and the mixture was continually mixed in a coprecipitator.

The mixture was co-precipitated at a pH of about 11, at about 40° C., and at about 1000 rpm, for 8 hours, preparing a $(NiCoMn)OH_2$ precursor. The precursor was washed with water and dried at about 120° C. in an oven, and the precursor and $Li_2CO_3$ were mixed at a weight ratio of about 1:1.03 using a hand mixer. The prepared mixture was heated by increasing the temperature at a rate of about 2° C./min to about 1050° C. and the mixture was kept at that temperature for about 15 hours to prepare a $LiNi_{0.5}Co_{0.2}Mn_{0.3}O_2$ lithium metal oxide.

Comparative Example 3

An approximately 3 M aqueous solution of $NiSO_4$, an approximately 3 M aqueous solution of $CoSO_4$, and an approximately 3 M aqueous solution of $MnSO_4$ were mixed in a mole ratio of 5:2:3. An approximately 7 M aqueous solution of NaOH and an approximately 1 M aqueous solution of $NH_4OH$ were added thereto, and the mixture was continually mixed in a coprecipitator.

The mixture was co-precipitated at a pH of about 11, at about 40° C., and at about 1000 rpm, for 8 hours, preparing a $(NiCoMn)OH_2$ precursor. The precursor was washed with water and dried at about 120° C. in an oven, and the precursor and $Li_2CO_3$ were mixed at a weight ratio of about 1:1.03 using a hand mixer. The prepared mixture was heated by increasing the temperature at a rate of about 2° C./min to about 750° C. and the mixture was kept at that temperature for about 15 hours to prepare a $LiNi_{0.5}Co_{0.2}Mn_{0.3}O_2$ lithium metal oxide.

Comparative Example 4

An approximately 3 M aqueous solution of $NiSO_4$, an approximately 3 M aqueous solution of $CoSO_4$, and an approximately 3 M aqueous solution of $MnSO_4$ were mixed in a mole ratio of 6:2:2. An approximately 7 M aqueous solution of NaOH and an approximately 1 M aqueous solution of $NH_4OH$ were added thereto, and the mixture was continually mixed in a coprecipitator.

The mixture was co-precipitated at a pH of about 11, at about 40° C., and at about 1000 rpm, for 8 hours, preparing a $(NiCoMn)OH_2$ precursor. The precursor was washed with water and dried at about 120° C. in an oven, and the precursor and $Li_2CO_3$ were mixed at a weight ratio of about 1:1.03 using a hand mixer. The prepared mixture was heated by increasing the temperature at a rate of about 2° C./min to about 970° C. and the mixture was kept at that temperature for about 15 hours to prepare a $LiNi_{0.6}Co_{0.2}Mn_{0.2}O_2$ lithium metal oxide.

Comparative Example 5

An approximately 3 M aqueous solution of $NiSO_4$, an approximately 3 M aqueous solution of $CoSO_4$, and an approximately 3 M aqueous solution of $MnSO_4$ were mixed in a mole ratio of 6:2:2. An approximately 7 M aqueous solution of NaOH and an approximately 1 M aqueous solution of $NH_4OH$ were added thereto, and the mixture was continually mixed in a coprecipitator.

The mixture was co-precipitated at a pH of about 11, at about 40° C., and at about 1000 rpm, for 8 hours, preparing a $(NiCoMn)OH_2$ precursor. The precursor was washed with water and dried at about 120° C. in an oven, and the precursor and $Li_2CO_3$ were mixed at a weight ratio of about 1:1.03 using a hand mixer. The prepared mixture was heated by increasing the temperature at a rate of about 2° C./min to about 750° C. and the mixture was kept at that temperature for about 15 hours to prepare a $LiNi_{0.6}Co_{0.2}Mn_{0.2}O_2$ lithium metal oxide.

Experimental Example 1

Analyzing Pore Size and Porosity of the Positive Active Materials

Figure 2:
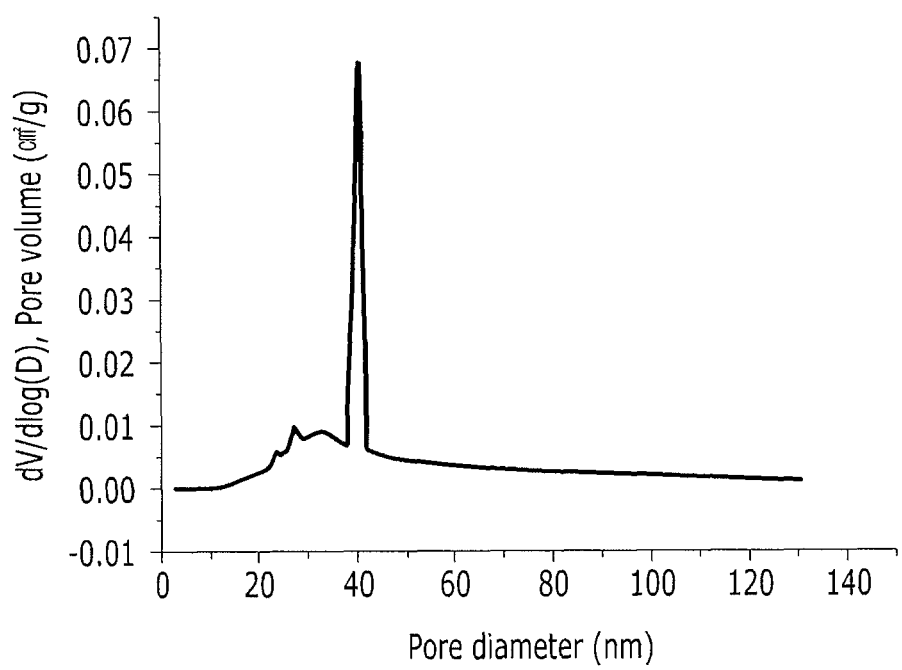
FIG. 2 is a graph showing the average pore size distribution of the positive active material according to Example 1 as measured by a BET method.

Each of the positive active materials prepared according to Examples 1 to 4 and Comparative Examples 1 to 5 was measured to determine pore size and porosity using BET equipment. The results are shown in FIG. 2 and Table 1. The BET equipment used may measure a pore size within the range of about 1.7 to about 300 nm.

FIG. 2 is a graph showing the average pore size distribution of the positive active material according to Example 1 as measured using the BET method. Referring to FIG. 2, the positive active material of Example 1 has an average pore diameter of about 20 to about 46 nm, and a porosity of about 2.53%.

TABLE 1

| | Average diameter of pore (nm) | Porosity (%) |
|---|---|---|
| Example 1 | 35 | 2.53 |
| Example 2 | 25 | 2.07 |
| Example 3 | 45 | 2.91 |
| Example 4 | 40 | 2.68 |
| Comparative Example 1 | 75 | 29.9 |
| Comparative Example 2 | 5 | 0.3 |
| Comparative Example 3 | 120 | 39.2 |
| Comparative Example 4 | 2 | 0.2 |
| Comparative Example 5 | 100 | 32.4 |

Figure 3:
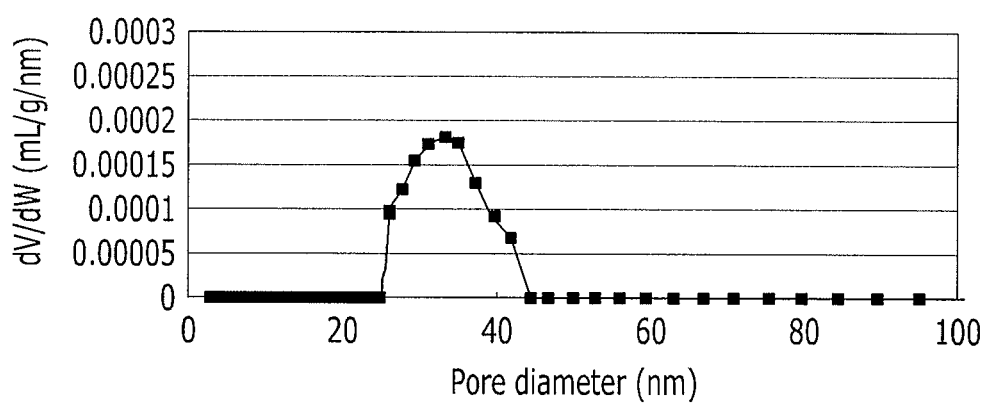
FIG. 3 is a graph showing the average pore size distribution of the positive active material according to Example 1 as measured by a mercury intrusion porosimetry.

FIG. 3 is a graph showing the average pore size distribution of the positive active material according to Example 1 as measured using mercury intrusion porosimetry. Referring to FIG. 3, the positive active material of Example 1 has a similar pore size distribution using mercury intrusion porosimetry as that shown in FIG. 2, where the positive active material of Example 1 was measured using a BET method.

Experimental Example 2

Analyzing Focus Ion Beam (FIB) Photographs of the Positive Active Materials

The interior structure of the positive active materials prepared according to Example 1 and Comparative Example 1 were analyzed using FIB equipment. The results are shown in FIGS. 4 and 5, respectively.

Figure 4:
FIG. 4 is a FIB analysis photograph of the positive active material according to Example 1.
Figure 5:
FIG. 5 is a FIB analysis photograph of the positive active material according to Comparative Example 1.

FIG. 4 is a FIB analysis photograph of the positive active material of Example 1, and FIG. 5 is a FIB analysis photograph of the positive active material of Comparative Example 1. The pore size and the porosity of the positive active material of Example 1 may be determined from the cross-section of FIG. 4. FIG. 5 shows that the positive active material according to Comparative Example 1 has large pore size and porosity.

Experimental Example 3

Analyzing Particle Analysis Graphs of the Positive Active Materials

Figure 6:
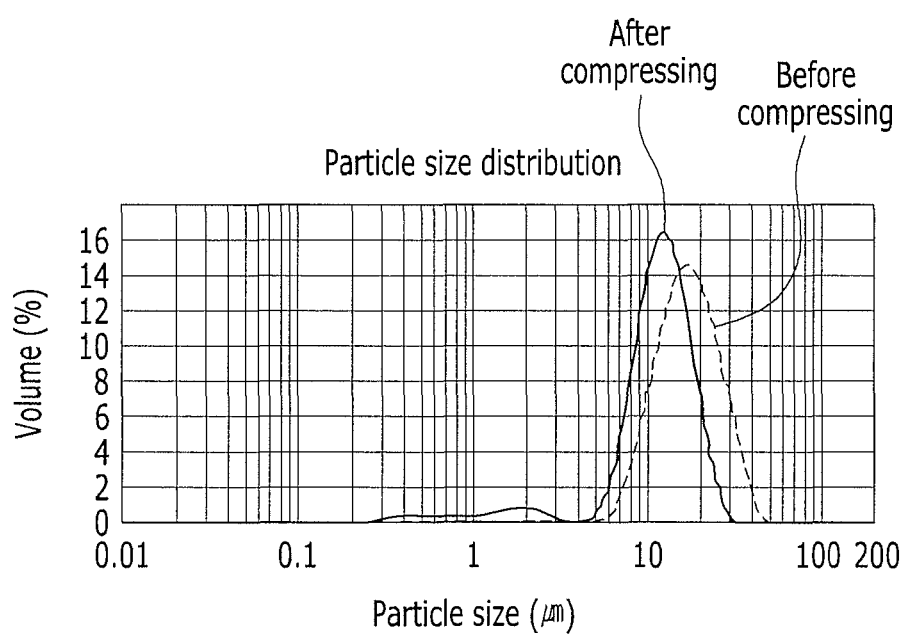
FIG. 6 is a graph showing a particle analysis of the positive active material according to Example 1.
Figure 7:
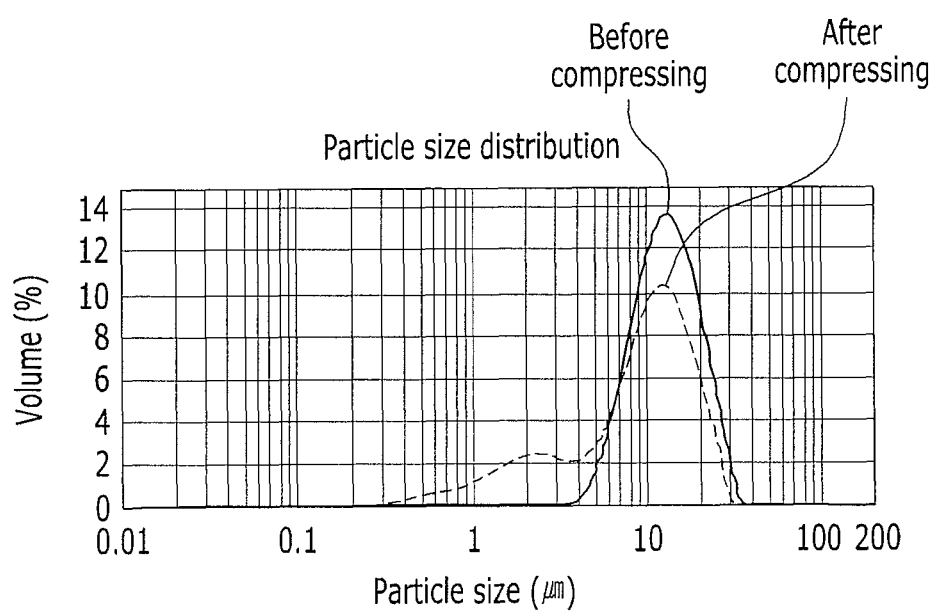
FIG. 7 is a graph showing a particle analysis of the positive active material according to Comparative Example 1.

The ability to reduce or prevent cracking during compression of each of the prepared positive active materials according to Example 1 and Comparative Example 1 was measured using a particle size analyzer. The results are shown in FIGS. 6 and 7.

The particle analysis was performed under the conditions as shown in Table 2.

TABLE 2

| Items | Values |
| --- | --- |
| Dispersion medium | pure water (water) |
| Radioactive isotope of particle (RI) | 1.36 |
| Residual error | <2% |
| Data processing | Average of 5 times measurement |
| Ultrasonic wave application | X |
| Dispersing agent application | X |

FIG. 6 is a particle analysis graph of the positive active material according to Example 1, and FIG. 7 is a particle analysis graph of the positive active material according to Comparative Example 1. Referring to FIG. 6, the positive active material of Example 1 has a pore size and porosity within the range according to embodiments of the present invention, and may prevent or reduce the occurrence of cracks after compressing because there is little change in the particle size distribution. Therefore, positive active materials according to embodiments of the present invention may have good particle strength. FIG. 7 shows a large change in particle size distribution after compression for the positive active material of Comparative Example 1. Accordingly, the positive active material having a pore size and porosity outside the range according to embodiments of the present invention may have more cracks as a result of lower particle strength, and therefore, thermal stability may be deteriorated due to reaction with the electrolyte.

Experimental Example 4

Analyzing DSC Graphs of the Positive Active Materials

The thermal stability of the positive active materials prepared according to Example 1 and Comparative Example 1 was measured using a differential scanning calorimeter (DSC Q20). The results are shown in FIG. 8.

Figure 8:
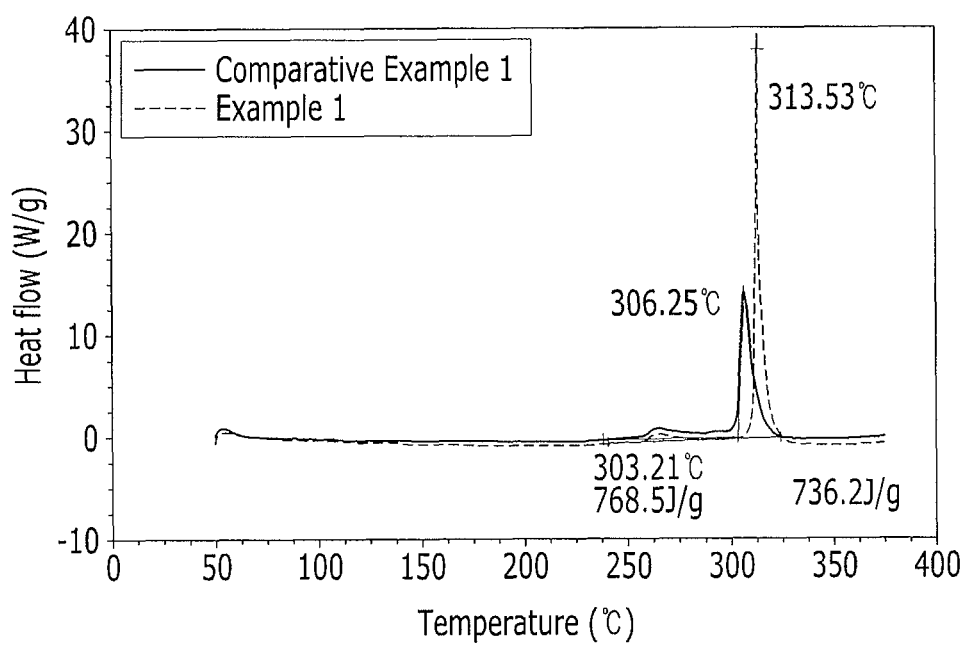
FIG. 8 is a graph of a DSC measurement result of the positive active material according to Example 1 and Comparative Example 1.

FIG. 8 shows the DSC measurement result of each positive active material according to Example 1 and Comparative Example 1. Referring to FIG. 8, the positive active material prepared according to an embodiment of the present invention (i.e., Example 1) has a pore size and porosity within the above disclosed ranges, and may have main peaks shifted to a higher temperature as compared to the positive active material having a pore size and porosity outside the range disclosed above. Therefore, positive active materials according to embodiments of the present invention may have good thermal stability.

Fabrication of Rechargeable Lithium Battery Cells 96 wt % of each of the positive active materials according to Examples 1 to 4 and Comparative Examples 1 to 5, 2 wt % of polyvinylidene fluoride (PVdF), and 2 wt % of acetylene black were mixed and dispersed in N-methyl-2-pyrrolidone to prepare positive active material slurries. Next, the positive active material slurries were coated on respective glass plates to prepare positive active material layers. The positive active material layers were transferred to 60 μm thick aluminum foils, dried at about 135° C. for about 3 hours or more, and compressed to fabricate positive electrodes.

Coin-type half-cells were fabricated using lithium metal as the counter electrodes to the positive electrodes (i.e., lithium metal was used as the negative electrodes). $LiPF_6$ (1.3 M concentration) dissolved in a mixed solution of ethylenecarbonate (EC) and dimethylcarbonate (DMC) mixed at a volume ratio of about 3:about 7 was used as the electrolyte solutions.

Experimental Example 5

Analyzing the Charge and Discharge Characteristics of the Lithium Rechargeable Battery Cells The charge and discharge characteristics of each rechargeable lithium battery cell obtained using the positive active materials prepared from Examples 1 to 4 and Comparative Examples 1 to 5 was measured under the below described conditions, and the results are shown in Table 3.

Each rechargeable lithium battery cell was charged at a 0.1 C rate, rested for 10 minutes, and discharged at a 0.1 C rate. Next, each rechargeable lithium battery cell was charged and discharged at a 0.2 C rate, a 0.5 C rate, and a 1.0 C rate using the same method. The charge and discharge were performed at 4.3V in CC/CV mode, and the following results show an initial capacity at a 0.1 C rate. The efficiency is the percentage of the initial discharge capacity with respect to the initial charge capacity.

TABLE 3

| | Charge capacity (0.1 C rate) (mAh/g) | Discharge capacity (0.1 C rate) (mAh/g) | Efficiency (0.1 C rate) (%) |
|---|---|---|---|
| Example 1 | 205.0 | 180.6 | 88.1 |
| Example 2 | 199.9 | 175.7 | 87.9 |
| Example 3 | 190.9 | 165.3 | 86.6 |
| Example 4 | 191.6 | 166.9 | 87.1 |
| Comparative Example 1 | 188.2 | 163.7 | 87.0 |
| Comparative Example 2 | 186.3 | 158.7 | 85.2 |
| Comparative Example 3 | 186.6 | 157.3 | 84.3 |
| Comparative Example 4 | 202.4 | 169.8 | 83.9 |
| Comparative Example 5 | 191.7 | 162.4 | 84.7 |

As shown in Table 3, the positive active materials according to embodiments of the present invention having the above described pore size and porosity may be high-capacity and high-efficiency rechargeable lithium batteries.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the above-mentioned embodiments are exemplary but do not limit the present invention in any sense.

What is claimed is:

1. A rechargeable lithium battery comprising:
a positive electrode comprising a positive active material comprising pores having an average diameter of about 10 nm to about 60 nm, and a porosity of about 0.5% to about 20%, the positive active material comprising a lithium metal oxide represented by Chemical Formula 1, Chemical Formula 2 or Chemical Formula 3:

$$Li_aNi_xCo_yMn_zM_kO_2 \quad \text{Chemical Formula 1}$$

wherein, in Chemical Formula 1,
M is selected from the group consisting of Al, Mg, Ti, Zr, and combinations thereof,
0.95≤a≤1.2,
0.45≤x≤0.65,
0.15≤y≤0.25,
0.15<z≤0.35,
0≤k≤0.1, and
x+y+z+k=1;

$$Li_aNi_xCo_yMn_zO_2 \quad \text{Chemical Formula 2}$$

wherein, in Chemical Formula 2,
0.95≤a≤1.10,
0.55≤x≤0.65,
0.15≤y≤0.25,
0.15<z≤0.25, and
x+y+z=1; and $$Li_aNi_xCO_yMn_zO_2 \quad \text{Chemical Formula 3}$$

wherein, in Chemical Formula 3,
0.95≤a≤1.10,
0.45≤x≤0.55,
0.15≤y≤0.25,
0.25<z≤0.35, and
x+y+z=1;

a negative electrode; and
an electrolyte.

2. The rechargeable lithium battery of claim 1, wherein the pores have an average diameter of about 20 nm to about 40 nm.

3. The rechargeable lithium battery of claim 1, wherein the positive active material comprises a lithium metal oxide represented by Chemical Formula 1.

4. The rechargeable lithium battery of claim 1, wherein the positive active material comprises a lithium metal oxide represented by Chemical Formula 2 or Chemical Formula 3.

5. The rechargeable lithium battery of claim 1, wherein the rechargeable lithium battery has a discharge capacity of about 170 mAh/g to about 190 mAh/g.

6. A positive active material for a rechargeable lithium battery comprising:
pores having an average diameter of about 10 nm to about 60 nm, and a porosity of about 0.5% to about 20%, the positive active material comprising a lithium metal oxide represented by Chemical Formula 1, Chemical Formula 2 or Chemical Formula 3:

$$Li_aNi_xCo_yMn_zM_kO_2 \quad \text{Chemical Formula 1}$$

wherein, in Chemical Formula 1,
M is selected from the group consisting of Al, Mg, Ti, Zr, and combinations thereof,
0.95≤a≤1.2,
0.45≤x≤0.65,
0.15≤y≤0.25,
0.15<z≤0.35,
0≤k≤0.1, and
x+y+z+k=1;

$$Li_aNi_xCo_yMn_zO_2 \quad \text{Chemical Formula 2}$$

wherein, in Chemical Formula 2,
0.95≤a≤1.10,
0.55≤x≤0.65,
0.15≤y≤0.25,
0.15<z≤0.25, and
x+y+z=1; and $$Li_aNi_xCO_yMn_zO_2 \quad \text{Chemical Formula 3}$$

wherein, in Chemical Formula 3,
0.95≤a≤1.10,
0.45≤x≤0.55,
0.15≤y≤0.25,
0.25<z≤0.35, and
x+y+z=1.

7. The positive active material of claim 6, wherein the pores have an average diameter of about 20 nm to about 40 nm.

8. The positive active material of claim 6, wherein the positive active material comprises a lithium metal oxide represented by Chemical Formula 1.

9. The positive active material of claim 6, wherein the positive active material comprises a lithium metal oxide represented by Chemical Formula 2 or Chemical Formula 3.

10. A method of fabricating the positive active material of claim 1, comprising:
preparing a precipitate by co-precipitating at least one of NH$_4$OH or NaOH with a Ni source material, a Co source material, and a Mn source material;
mixing the precipitate and a lithium source material to prepare a mixture; and heat-treating the mixture for about 8 to about 10 hours at about 800° C. to about 950° C. to prepare the positive active material comprising pores with an average diameter of about 10 nm to about 60 nm, and a porosity of about 0.5% to about 20%, the positive active material comprising a lithium metal oxide represented by Chemical Formula 1, Chemical Formula 2 or Chemical Formula 3.

11. The method of claim 10, wherein the positive active material comprises a lithium metal oxide represented by Chemical Formula 1.

12. The method of claim 10, wherein the heat-treating is performed at about 800° C. to about 900° C.

13. The method of claim 10, wherein the co-precipitating is performed at a stirring speed of about 600 rpm to about 800 rpm.

14. The method of claim 10, wherein the co-precipitating is performed at a pH of about 10 to about 12.

15. The method of claim 10, wherein the co-precipitating is performed for about 8 to about 10 hours.

16. The method of claim 10, wherein the co-precipitating is performed at about 35° C. to about 40° C.

17. The method of claim 10, wherein the precipitate and the lithium source material are mixed at a weight ratio of about 1:1 to about 1:1.1.

* * * * *